(12) United States Patent
Vignola

(10) Patent No.: US 8,188,190 B2
(45) Date of Patent: *May 29, 2012

(54) METHOD OF IMPROVING THE BUBBLE STABILITY OF A BLOWN FILM OF A THERMOPLASTIC RESIN

(75) Inventor: Eric Vignola, Airdrie (CA)

(73) Assignee: NOVA Chemicals Inc., Moon Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,460

(22) Filed: Oct. 21, 2011

(65) Prior Publication Data

US 2012/0035313 A1 Feb. 9, 2012

Related U.S. Application Data

(63) Continuation of application No. 12/725,851, filed on Mar. 17, 2010, now Pat. No. 8,053,525.

(60) Provisional application No. 61/219,992, filed on Jun. 24, 2009, provisional application No. 61/289,108, filed on Dec. 22, 2009.

(51) Int. Cl.
*C08F 8/00* (2006.01)
*C08L 23/00* (2006.01)
*C08L 25/02* (2006.01)
*C08L 27/02* (2006.01)
*C08L 31/00* (2006.01)
*C08L 33/02* (2006.01)
*C08L 33/14* (2006.01)

(52) U.S. Cl. ........ 525/191; 525/213; 525/220; 525/221; 525/222; 525/232; 525/240; 525/241

(58) Field of Classification Search .................. 525/191, 525/213, 220, 221, 222, 232, 240, 241
See application file for complete search history.

(56) References Cited

U.S. PATENT DOCUMENTS 8,053,525 B2 * 11/2011 Vignola ........................ 525/191
2012/0021238 A1 * 1/2012 Krupinski et al. ............ 428/521

* cited by examiner

*Primary Examiner* — Nathan M Nutter
(74) *Attorney, Agent, or Firm* — Gary F. Matz

(57) ABSTRACT

A method of modifying the rheology of a thermoplastic resin that includes the steps of providing a thermoplastic resin and blending interpolymer resin particles with the thermoplastic resin. The interpolymer resin contains a styrenic polymer intercalated within a polyolefin, such that the thermoplastic resin is present as a continuous phase and the interpolymer resin is present as a dispersed phase. The method provides a rheology modified thermoplastic resin with improved physical characteristics.

25 Claims, No Drawings

METHOD OF IMPROVING THE BUBBLE STABILITY OF A BLOWN FILM OF A THERMOPLASTIC RESIN

REFERENCE TO RELATED APPLICATION

This application is a continuation of U.S. application Ser. No. 12/725,851, filed Mar. 17, 2010 and entitled "Method of Modifying the Rheology of a Thermoplastic Resin," which issued as U.S. Pat. No. 8,053,525 on Nov. 8, 2011 claiming the benefit of priority of U.S. Provisional Application Ser. Nos. 61/219,992 filed Jun. 24, 2009 and 61/289,108 filed Dec. 22, 2009, both entitled "Method of Modifying the Rheology of a Thermoplastic Resin", which are both herein incorporated by reference in their entirety.

BACKGROUND OF THE INVENTION

1. Field of the Invention

The present invention is directed to methods of modifying the rheology of thermoplastic resins and in particular to compositions containing thermoplastics and polyolefin containing interpolymers.

2. Description of the Prior Art

Thermoplastics, such as polyolefins are often used in applications such as blown film, cast films, solid sheets, injection molded articles, thermoformed articles, blow molded articles, rotomolded articles, compression molded articles, and functional films. In many processing operations, the throughput rate, melt elasticity, processibility and physical properties such as strength properties, heat seal properties, rheological properties, diffusion properties, and optical properties of the polyolefins do not meet the needs of the end user and/or are slow and/or difficult to process.

As a non-limiting example, the low shear viscosity of many thermoplastics is too low under normal processing conditions and thermoformed articles made from the polyolefin are non-uniform with thin sections that create weak points in the structure of the article.

In another non-limiting example, many thermoplastics can be too elastic under processing conditions resulting in poor processibility and low throughput rates.

As a further non-limiting example, many thermoplastics can be too viscous under processing conditions, also resulting in poor processibility and low throughput rates.

Thus, there is a need in the art for thermoplastic, and in particular polyolefin and elastomer compositions that provide an adequate balance between viscous and elastic properties to provide good processibility while maintaining good physical properties such as strength properties, heat seal properties, and optical properties.

SUMMARY OF THE INVENTION

The present invention provides a method of modifying the rheology of a thermoplastic resin. The method includes the steps of providing a thermoplastic resin and blending interpolymer resin particles with the thermoplastic resin. The interpolymer resin contains a styrenic polymer intercalated within a polyolefin, such that the thermoplastic resin is present as a continuous phase and the interpolymer resin is present as a dispersed phase.

The present invention also provides a rheology modified thermoplastic resin made according to the above described method.

DETAILED DESCRIPTION OF THE INVENTION

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the terms "chi" or "X", refer to the thermodynamic interaction parameter calculated from the differences in the solubility parameter ($\delta$) for each of two materials, determined at 20° C.

As used herein, the term "continuous phase" refers to a material into which an immiscible material is dispersed. In embodiments of the present invention, polyolefins provide a continuous phase into which a monomer mixture is dispersed. In other embodiments of the invention, polyolefin particles are dispersed in an aqueous continuous phase during polymerization.

As used herein, the term "dispersed phase" refers to a material in droplet or particulate form which is distributed within an immiscible material. In embodiments of the present invention, a monomer mixture provides a dispersed phase in a continuous phase containing one or more polyolefins. In other embodiments of the invention, the present interpolymer resin particles make up a dispersed phase within a thermoplastic, in many cases a polyolefin, continuous phase.

As used herein, the term "elastomer" refers to materials that have the ability to undergo deformation under the influence of a force and regain its original shape once the force is removed. In many embodiments of the invention, elastomers include homopolymers and copolymers containing polymerized residues derived from isoprene and/or butadiene.

As used herein, the term "intercalated" refers to the insertion of one or more polymer molecules within the domain of one or more other polymer molecules having a different composition. In embodiments of the invention, as described herein below, styrenic polymers are inserted into polyolefin particles by polymerizing a styrenic monomer mixture within the polyolefin particles.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "monomer" refers to small molecules containing at least one double bond that reacts in the presence of a free radical polymerization initiator to become chemically bonded to other monomers to form a polymer.

As used herein, the term, "olefinic monomer" includes, without limitation, α-olefins, and in particular embodiments ethylene, propylene, 1-butene, 1-hexene, 1-octene and combinations thereof.

As used herein, the term "polyolefin" refers to a material, which is prepared by polymerizing a monomer composition containing at least one olefinic monomer.

As used herein, the term "polyethylene" includes, without limitation, homopolymers of ethylene and copolymers of ethylene and one or more of propylene, 1-butene, 1-hexene and 1-octene.

As used herein, the term "polymer" refers to macromolecules composed of repeating structural units connected by covalent chemical bonds and is meant to encompass, without limitation, homopolymers, random copolymers, block copolymers and graft copolymers.

As used herein, the term "styrenic polymer" refers to a polymer derived from polymerizing a mixture of one or more monomers that includes at least 50 wt. % of one or more monomers selected from styrene, p-methyl styrene, α-methyl styrene, tertiary butyl styrene, dimethyl styrene, nuclear brominated or chlorinated derivatives thereof and combinations thereof.

As used herein, the term "solubility parameter" of "δ" refers to the Hildebrand Solubility Parameter.

As used herein, the term "thermoplastic" refers to a class of polymers that soften or become liquid when heated and harden when cooled. In many cases, thermoplastics are high-molecular-weight polymers that can be repeatedly heated and remolded. In many embodiments of the invention, thermoplastic resins include polyolefins and elastomers that have thermoplastic properties.

As used herein, the terms "thermoplastic elastomers" and "TPE" refer to a class of copolymers or a blend of polymers (in many cases a blend of a thermoplastic and a rubber) which includes materials having both thermoplastic and elastomeric properties.

As used herein, the terms "thermoplastic olefin" or "TPO" refer to polymer/filler blends that contain some fraction of polyethylene, polypropylene, block copolymers of polypropylene, rubber, and a reinforcing filler. The fillers can include, without limitation, talc, fiberglass, carbon fiber, wollastonite, and/or metal oxy sulfate. The rubber can include, without limitation, ethylene-propylene rubber, EPDM (ethylene-propylene-diene rubber), ethylene-butadiene copolymer, styrene-ethylene-butadiene-styrene block copolymers, styrene-butadiene copolymers, ethylene-vinyl acetate copolymers, ethylene-alkyl (meth)acrylate copolymers, very low density polyethylene (VLDPE) such as those available under the Flexomer® resin trade name from the Dow Chemical Co., Midland, Mich., styrene-ethylene-ethylene-propylene-styrene (SEEPS). These can also be used as the materials to be modified by the interpolymer to tailor their rheological properties.

Unless otherwise specified, all molecular weight values are determined using gel permeation chromatography (GPC) using appropriate polystyrene standards. Unless otherwise indicated, the molecular weight values indicated herein are weight average molecular weights (Mw).

The present invention provides a method of modifying the rheology of a thermoplastic resin, in many embodiments a polyolefin resin. The method generally includes the steps of providing a thermoplastic resin and blending interpolymer resin particles that contain a styrenic polymer intercalated within a polyolefin, such that the thermoplastic resin is present as a continuous phase and the interpolymer resin is present as a dispersed phase. The present method provides a rheology modified thermoplastic resin.

In embodiments of the invention, the thermoplastic resin includes a polyolefin. In other embodiments of the invention, the thermoplastic resin is made up of one or more polyolefin resins.

Any suitable polyolefin resin can be used in the present method. In many embodiments of the invention, the polyolefin resin includes at least one polyethylene. In particular embodiments, the polyethylene is one or more of linear low density polyethylene and low density polyethylene.

In some embodiments of the invention, the polyolefin of the thermoplastic resin includes a copolymer derived from one or more olefinic monomers and one or more monomers selected from, without limitation, $C_1$-$C_4$ alkyl (meth)acrylates, (meth)acrylonitrile, vinyl acetate, butadiene, isoprene, styrene, and combinations thereof.

In other embodiments of the invention, the polyolefin of the thermoplastic resin includes one or more polymers selected from homopolymers of any $C_2$-$C_8$ linear or branched α-olefins; copolymers of ethylene and one or more $C_3$-$C_8$ α-olefins; copolymers of one or more $C_2$-$C_8$ linear or branched α-olefins and vinyl acetate and/or $C_1$-$C_8$ alkyl esters of (meth)acrylic acid, and combinations thereof.

The thermoplastic resin can include blends of different resins. As a non-limiting example, the thermoplastic resin can include a blend of two or more polyolefins and elastomers, and in particular two or more of polyethylene, polypropylene, ethylene-vinyl acetate copolymers, ABS, polycarbonate, TPO, TPE, polyphenylene oxide, styrene-acrylonitrile copolymers, styrene butadiene block copolymer (SBC), ethylene-alkyl(meth)-acrylate copolymers, and other such materials.

The thermoplastic resin is present in the rheology modified thermoplastic resin at a level of at least about 30 wt. %, in some instances at least about 40 wt. %, in other instances at least about 50 wt. %, in some situations at least about 60 wt. %, in other situations at least about 65 wt. %, in some cases at least about 70 wt. % and in other cases at least about 75 wt. % of the rheology modified thermoplastic resin. Also, the thermoplastic resin is present in the rheology modified thermoplastic resin at a level of up to about 99.9 wt. %, in some cases up to about 99.5 wt. %, in other cases up to about 99 wt. %, in some instances up to about 98 wt. %, in other instances up to about 97 wt. %, in some situations up to about 95 wt. % and in other situations up to about 90 wt. % of the rheology modified thermoplastic resin. The amount and types of thermoplastic resin present in the rheology modified thermoplastic resin is determined based on the desired end use and physical properties. The amount of thermoplastic resin in the rheology modified thermo-plastic resin can be any value or range between any of the values recited above.

The dispersed phase in the present invention includes non-expandable interpolymer resin particles having little or no gel content. In embodiments of the invention, the interpolymer resin particles can have, at least in part, a crystalline morphology. The interpolymer resin includes a polyolefin and an intercalated polymer that contains repeat units derived from one or more styrenic monomers.

In particular embodiments of the invention, the interpolymer resin particles can include the unexpanded interpolymer resin particles described in U.S. Pat. No. 7,411,024, the disclosure of which is incorporated herein by reference in its entirety.

In embodiments of the invention, the interpolymer resin particles include at least about 20, in some cases at least about 25, in other cases at least about 30, in some instances at least about 35 and in other instances at least about 40 wt. % of one or more polyolefins. Also, the interpolymer resin particles include up to about 80, in some instances up to about 60, in some cases up to about 55, and in other cases up to about 50 wt. % of one or more polyolefins. The polyolefin content of the interpolymer resin particles can be any value or range between any of the values recited above.

In embodiments of the invention, the polyolefin in the interpolymer resin particles includes one or more of polyethylene, polypropylene, thermoplastic olefins (TPO's), and thermoplastic elastomers (TPE's) resins. In particular embodiments of the invention, the polyethylene is one or more of linear low density polyethylene and low density polyethylene. Suitable polyolefins are those that provide the desirable properties in the present interpolymer resin particles as described below.

In embodiments of the invention, the polyethylene can include a homopolymer of ethylene, ethylene copolymers that include at least 50 mole % and in some cases at least 70 mole %, of an ethylene unit and a minor proportion of a monomer copolymerizable with ethylene, ethylene-vinyl acetate copolymers, HDPE, LDPE, LLDPE, VLDPE, and a blend of at least 50% by weight, preferably at least 60% by weight, of the ethylene homopolymer or copolymer with another polymer.

Non-limiting examples of monomers copolymerizable with ethylene include vinyl acetate, vinyl chloride, propylene, butene, hexene, (meth)acrylic acid and its esters, butadiene, isoprene, styrene and combinations thereof.

Non-limiting examples of the other polymers that may be blended with the ethylene homopolymer or copolymer include any polymer compatible with it. Non-limiting examples include polypropylene, polybutadiene, polyisoprene, polychloroprene, chlorinated polyethylene, polyvinyl chloride, a styrene/butadiene copolymer, a vinyl acetate/ethylene copolymer, an acrylonitrile/-butadiene copolymer, a vinyl chloride/vinyl acetate copolymer, etc. Especially preferred species are polypropylene, polybutadiene, styrene/butadiene copolymer and combinations thereof.

Non-limiting examples of polyethylene that can be included in the interpolymer resin particles include low-, medium-, and high-density polyethylene, an ethylene vinyl acetate copolymer, an ethylene/propylene copolymer, a blend of polyethylene and polypropylene, a blend of polyethylene and an ethylene/vinyl acetate copolymer, and a blend of polyethylene and an ethylene/propylene copolymer.

In embodiments of the invention, the polyethylene resin particles used to form the interpolymer resin particles of the invention can have a melt index (MI) of about 0.2 to 4 g/10 minutes under Condition I, 190° C., 2.16 kg (equivalent to 11.9 g/10 minutes under Condition G, 230° C. 5.0 kg); a number average molecular weight of 20,000 to 60,000; an intrinsic viscosity, at 75° C. in xylene, of 0.8 to 1.1; a density of 0.910 to 0.940 g/cm$^3$, and a VICAT softening temperature greater than 85° C.

In embodiments of the invention, the polyolefin of the interpolymer resin has a VICAT softening temperature greater than 85° C., in some cases at least about 90° C. and in other cases at least about 95° C. and can be up to about 115° C.

In embodiments of the invention, the polyolefin of the interpolymer resin has a melt flow of at least 0.2, in some cases at least about 0.5, in other cases at least about 1.0, in some instances at least about 2.1, in other instances at least about 2.5, in some situations at least about 3.0 and in other situations at least about 4.0 g/10 minutes (230° C., 2.16 kg under ASTM D-1238).

The styrenic polymer is a polymer derived from polymerizing a monomer mixture of one or more styrenic monomers and optionally one or more other monomers. Any suitable styrenic monomer can be used in the invention. Suitable styrenic monomers are those that provide the desirable properties in the present interpolymer resin particles as described below. Non-limiting examples of suitable styrenic monomers include styrene, p-methyl styrene, α-methyl styrene, ethyl styrene, vinyl toluene, tertiary butyl styrene, isopropylxylene, dimethyl styrene, nuclear brominated or chlorinated derivatives thereof and combinations thereof.

When the monomer mixture includes other monomers, the styrenic monomers are present in the monomer mixture at a level of at least 50%, in some cases at least 60% and in other cases at least 70% and can be present at up to 99%, in some cases up to 95%, in other cases up to 90%, and in some situations up to 85% by weight based on the monomer mixture. The styrenic monomers can be present in the monomer mixture at any level or can range between any of the values recited above.

Suitable other monomers that can be included in the monomer mixture include, without limitation, maleic anhydride, $C_1$-$C_4$ alkyl (meth)acrylates, acrylonitrile, vinyl acetate, and combinations thereof.

When the monomer mixture includes other monomers, the other monomers are present in the monomer mixture at a level of at least 1%, in some cases at least 5%, in other cases at least 10%, in some instances at least 15%, in other instances at least 20%, in some situations at least 25% and in other situations at least 30% and can be present at up to 50%, in some cases up to 40%, and in other cases up to 30% by weight based on the monomer mixture. The other monomers can be present in the monomer mixture at any level or can range between any of the values recited above.

In embodiments of the invention, the interpolymer resin particles include at least about 40, in some cases at least about 45 and in other cases at least about 50 wt. % of one or more styrenic polymers. Also, the interpolymer resin particles include up to about 80, in some cases up to about 75, in other cases up to about 70, in some instances up to about 65 and in other instances up to about 60 wt. % of one or more styrenic polymers. The styrenic polymer content of the interpolymer resin particles can be any value or range between any of the values recited above.

In embodiments of the invention, cross-linking of the polyolefin resin particles is minimized or eliminated as reflected by the gel content in the interpolymer resin. In particular embodiments of the invention, the gel content of the interpolymer resin is 0 and can be up to about 1.5 wt. %, in other cases up to about 1.0 wt. %, in other cases up to about 0.8 wt. % and in some instances up to about 0.5 wt. %. The gel content of the interpolymer resin can range between 0 and any of the values recited above.

In embodiments of the invention, the VICAT softening temperature of the interpolymer resin particles can be at least about 90° C. and in some cases at least about 95° C. and can be up to about 115° C., in some cases up to about 110° C. and in other cases at least about 105° C. The VICAT softening temperature of the interpolymer resin particles can be any value or range between any of the values recited above.

In embodiments of the invention, the melt index value of the interpolymer resin particles can be at least about 0.2, in some cases at least about 0.5, in other cases at least about 1, in some instances at least about 2.5 and in other instances at least about 5 g/10 minutes (Condition G) and can be up to about 35, in some cases up to about 30, in other cases up to about 25, in some instances up to about 20 and in some instances up to about 15 g/10 minutes (Condition G). The melt index value of the interpolymer resin particles can be any value or range between any of the values recited above.

In embodiments of the invention, the interpolymer resin particles are prepared using a process that includes: providing the above described polyolefin resin particles suspended in an aqueous medium; minimizing or eliminating cross-linking in the polyolefin resin particles; adding to the aqueous suspension a monomer mixture that includes a vinyl aromatic monomer, and a polymerization initiator for polymerizing the monomer mixture within the polyolefin resin particles; and polymerizing the monomer mixture in the polyolefin resin particles to form the interpolymer resin particles.

In embodiments of the invention, the interpolymer resin particles are formed as follows: in a reactor, the polyolefin resin particles are dispersed in an aqueous medium prepared by adding 0.01 to 5%, in some cases 2 to 3% by weight based on the weight of the water of a suspending or dispersing agent such as water soluble high molecular materials, e.g., polyvinyl alcohol, methyl cellulose, and slightly water soluble inorganic materials, e.g., calcium phosphate or magnesium pyrophosphate, and then the vinyl aromatic monomers are added to the suspension and polymerized inside the polyolefin resin particles to form an interpenetrating network of polyolefin and vinyl aromatic monomers.

Any of the conventionally known and commonly used suspending agents for polymerization can be employed. These agents are well known in the art and may be freely selected by one skilled in the art. Water is used in an amount generally from 0.7 to 5, in many cases 3 to 5 times that of the starting polyolefin particles added to the aqueous suspension, on a weight basis.

When the polymerization of the vinyl aromatic monomer is completed, the polymerized vinyl aromatic resin is uniformly dispersed inside the polyolefin particles.

Methods of preparing the interpolymer resin particles are disclosed, as a non-limiting example, in U.S. Pat. No. 7,411,024.

The interpolymer resin particles of the invention may suitably be coated with compositions comprising silicones, metal or glycerol carboxylates, suitable carboxylates are glycerol mono-, di- and tri-stearate, zinc stearate, calcium stearate, and magnesium stearate; and mixtures thereof. Examples of such compositions may be those disclosed in GB Patent No. 1,409,285 and in Stickley U.S. Pat. No. 4,781,983. The coating composition can be applied to the interpolymer resin particles via dry coating or via a slurry or solution in a readily vaporizing liquid in various types of batch and continuous mixing devices. The coating aids in transferring the interpolymer resin particles easily through the processing equipment.

The interpolymer resin particles can contain other additives, which can include, without limitation, chain transfer agents, nucleating agents, agents that enhance biodegradability and other polymers.

Suitable chain transfer agents include, but are not limited to, $C_{2-15}$ alkyl mercaptans, such as n-dodecyl mercaptan, t-dodecyl mercaptan, t-butyl mercaptan and n-butyl mercaptan, and other agents such as pentaphenyl ethane and the dimer of α-methyl styrene, and combinations thereof.

Suitable nucleating agents, include, but are not limited to, polyolefin waxes. The polyolefin waxes, which include without limitation, polyethylene waxes, have a weight average molecular weight of from 250 to 5,000 and are typically finely divided through the polymer matrix in a quantity of 0.01 to 2.0% by weight, based on the interpolymer resin composition. The interpolymer resin particles can also contain from 0.1 to 0.5% by weight based on the interpolymer resin, talc, organic bromide-containing compounds, and polar agents as described in WO 98/01489, which include isalkylsulphosuccinates, sorbital-$C_{8-20}$-carboxylates, and $C_{8-20}$-alkylxylene sulphonates.

In some embodiments of the invention, other materials such as elastomers and additives can be added in whole or part to the interpolymer resin particles.

In various embodiments of the invention, various materials or additives are added to the interpolymer resin particles so that it acts as a carrier for the materials or additives.

In many embodiments of the invention, the interpolymer can be processed (extruded, dried, etc.) prior to use as a rheology modifier to remove any moisture, unreacted volatiles or reaction decomposition products from the interpolymer.

The interpolymer resin particles are generally present in the rheology modified thermoplastic resin at a level of at least about 0.1 wt. %, in some cases at least about 0.5 wt. %, and in other cases at least about 1 wt. % and can be up to about 70 wt. %, in some cases up to about 60 wt. % in other cases up to about 50 wt. % in some instances up to about 40 wt. %, in other instances up to about 30 wt. % and in some situations up to about 25 wt. % of the rheology modified thermoplastic resin. The amount of interpolymer resin particles in the rheology modified thermoplastic resin will vary depending on the particular thermoplastic resins and/or elastomers in the rheology modified thermoplastic resin and the end use. The amount of interpolymer resin particles in the rheology modified thermoplastic resin can be any value or range between any of the values recited above.

In some particular embodiments, the rheology modified thermoplastic resin is intended to be used in thermoforming operations and the interpolymer resin particles are present in the rheology modified thermoplastic resin at a level of at least about 10 wt. %, in some cases at least about 12.5 wt. %, and in other cases at least about 15 wt. % and up to about 50 wt. %, in some cases up to about 40 wt. %, in other cases up to about 35 wt. %, in some instances up to about 30 wt. % and in other instances up to about 25 wt. % of the rheology modified thermoplastic resin.

In other particular embodiments, the rheology modified thermoplastic resin is intended to be used in foam applications and the interpolymer resin particles are present in the rheology modified thermoplastic resin at a level of at least about 0.1 wt. %, in some cases at least about 0.5 wt. %, and in other cases at least about 1 wt. % and up to about 10 wt. %, in some cases up to about 7.5 wt. % and in other cases up to about 10 wt. % of the rheology modified thermoplastic resin.

In some embodiments of the invention, the rheology modified thermoplastic resin can be made by preparing a first blend of the interpolymer resin particles with one or more first thermoplastic resins and/or elastomers and then blending the first blend into one or more second thermoplastic resins and/or elastomers.

The rheology modified thermoplastic resin can optionally include, depending on its intended use, additives and adjuvants, which can include, without limitation, anti-blocking agents, antioxidants, anti-static additives, activators, zinc oxide, colorants, dyes, filler materials, flame retardants, heat stabilizers, impact modifiers, light stabilizers, light absorbers, lubricants, pigments, plasticizers, slip agents, softening agents, and combinations thereof.

Suitable anti-blocking agents, slip agents and lubricants include without limitation silicone oils, liquid paraffin, synthetic paraffin, mineral oils, petrolatum, petroleum wax, polyethylene wax, hydrogenated polybutene, higher fatty acids and the metal salts thereof, linear fatty alcohols, glycerine, sorbitol, propylene glycol, fatty acid esters of monohydroxy or polyhydroxy alcohols, phthalates, hydrogenated castor oil, beeswax, acetylated monoglyceride, hydrogenated sperm oil, ethylenebis fatty acid esters, and higher fatty amides. Suitable lubricants include, but are not limited to, ester waxes such as the glycerol types, the polymeric complex esters, the oxidized polyethylene type ester waxes and the like, metallic stearates such as barium, calcium, magnesium, zinc and aluminum stearate, salts of 12-hydroxystearic acid, amides of 12-hydroxy-stearic acid, stearic acid esters of polyethylene glycols, castor oil, ethylene-bis-stearamide, ethylene bis cocamide, ethylene bis lauramide, pentaerythritol adipate stearate and combinations thereof in an amount of from 0.1 to 2 wt. % of the rheology modified thermoplastic resin.

Suitable antioxidants include without limitation Vitamin E, citric acid, ascorbic acid, ascorbyl palmitate, butylated phenolic antioxidants, tert-butylhydroquinone (TBHQ) and propyl gallate (PG), butylated hydroxyanisole (BHA), butylated hydroxytoluene (BHT), and hindered phenolics such as IRGANOX® 1010 and IRGANOX 1076 available from Ciba Specialty Chemicals Corp., Tarrytown, N.Y.

Suitable anti-static agents include, without limitation, glycerine fatty acid, esters, sorbitan fatty acid esters, propylene glycol fatty acid esters, stearyl citrate, pentaerythritol fatty acid esters, polyglycerine fatty acid esters, and polyoxethylene glycerine fatty acid esters in an amount of from 0.01 to 2 wt. % of the rheology modified thermoplastic resin.

Suitable colorants, dyes and pigments are those that do not adversely impact the desirable physical properties of the rheology modified thermoplastic resin include, without limitation, white or any colored pigment. In embodiments of the invention, suitable white pigments contain titanium oxide, zinc oxide, magnesium oxide, cadmium oxide, zinc chloride, calcium carbonate, magnesium carbonate, kaolin clay and combinations thereof in an amount of 0.1 to 20 wt. % of the rheology modified thermoplastic resin. In embodiments of the invention, the colored pigment can include carbon black, phthalocyanine blue, Congo red, titanium yellow or any other colored pigment typically used in the printing industry in an amount of 0.1 to 20 wt. % of the rheology modified thermoplastic resin. In embodiments of the invention, the colorants, dyes and pigments include inorganic pigments including, without limitation, titanium dioxide, iron oxide, zinc chromate, cadmium sulfides, chromium oxides and sodium aluminum silicate complexes. In embodiments of the invention, the colorants, dyes and pigments include organic type pigments, which include without limitation, azo and diazo pigments, carbon black, phthalocyanines, quinacridone pigments, perylene pigments, isoindolinone, anthra-quinones, thio-indigo and solvent dyes.

Suitable fillers are those that do not adversely impact, and in some cases enhance, the desirable physical properties of the rheology modified thermoplastic resin. Suitable fillers, include, without limitation, talc, silica, alumina, calcium carbonate in ground and precipitated form, barium sulfate, talc, metallic powder, glass spheres, barium stearate, calcium stearate, aluminum oxide, aluminum hydroxide, glass, clays such as kaolin and montmorolites, mica, silica, alumina, metallic powder, glass spheres, titanium dioxide, diatomaceous earth, calcium stearate, aluminum oxide, aluminum hydroxide, and fiberglass, and combinations thereof can be incorporated into the polymer composition in order to reduce cost or to add desired properties to the rheology modified thermoplastic resin. The amount of filler is desirably less than 10% of the total weight of the rheology modified thermoplastic resin as long as this amount does not alter the properties of the rheology modified thermoplastic resin.

Suitable flame retardants include, without limitation, brominated polystyrene, brominated polyphenylene oxide, red phosphorus, magnesium hydroxide, magnesium carbonate, antimony pentoxide, antimony trioxide, sodium antimonite, zinc borate and combinations thereof in an amount of 0.1 to 2 wt. % of the rheology modified thermoplastic resin.

Suitable heat stabilizers include, without limitation, phosphite or phosphonite stabilizers and hindered phenols, non-limiting examples being the IRGANOX® stabilizers and antioxidants available from Ciba Specialty Chemicals. When used, the heat stabilizers are included in an amount of 0.1 to 2 wt. % of the rheology modified thermoplastic resin.

Suitable impact modifiers include, without limitation, high impact polystyrene (HIPS), SEEPS, ethylene-methacrylate resins (EMA), styrene/butadiene block copolymers, ABS, copolymers of $C_1$-$C_{12}$ linear, branched or cyclic olefins, $C_1$-$C_{12}$ linear, branched or cyclic alkyl esters of (meth)acrylic acid, styrenic monomers, styrene/ethylene/butene/styrene, block copolymers, styrene/ethylene copolymers. The amount of impact modifier used is typically in the range of 0.5 to 25 wt. % of the rheology modified thermoplastic resin. Suitable ultra-violet light (UV) stabilizers include, without limitation, 2-hydroxy-4-(octyloxy)-benzophenone, 2-hydroxy-4-(octyloxy)-phenyl phenyl-methanone, 2-(2'-hydroxy-3,5'-di-ter-amylphenyl)benzotriazole, and the family of UV stabilizers available under the trade name TINUVIN® from Ciba Specialty Chemicals Co., Tarrytown, N.Y., in an amount of 0.1 to 2 wt. % of the rheology modified thermoplastic resin.

Suitable ultraviolet light absorbers, include without limitation, 2-(2-hydroxyphenyl)-2H-benzo-triazoles, for example, known commercial hydroxyphenyl-2H-benzotriazoles and benzotriazoles hydroxybenzophenones, acrylates, malonates, sterically hindered amine stabilizers, sterically hindered amines substituted on the N-atom by a hydroxy-substituted alkoxy group, oxamides, tris-aryl-o-hydroxyphenyl-s-triazines, esters of substituted and unsubstituted benzoic acids, nickel compounds, and combinations thereof, in an amount of 0.1 to 2 wt. % of the rheology modified thermoplastic resin.

Suitable softening agents and plasticizers include, without limitation, cumarone-indene resin, d-limonene, terpene resins, and oils in an amount of about 2 parts by weight or less based on 100 parts by weight of the rheology modified thermoplastic resin.

In embodiments of the invention, the components of the rheology modified thermoplastic resin are combined into a homogenous mixture by any suitable technique, which can include without limitation, mixing extrusion (compounding) and milling. The rheology modified thermoplastic resin components are then blended in the form of granules or in powder form, according to the types of components, in a blender before plastification and homogenization. Blending may be effected in a discontinuous process working with batches or in a continuous process.

In embodiments of the invention, the components can be mixed, for example, in an internal mixer of Banbury type, in a single or twin-screw co-rotary or counter-rotary extruder, or in any other mixer capable of supplying sufficient energy to melt and fully homogenize the mixture.

In particular embodiments of the invention, production of the mixture resulting from the composition can be done by mixing extrusion (compounding) in a twin-screw extruder. Such a mixture must be a uniform and homogenous mixture.

In embodiments of the invention, the mixed rheology modified thermoplastic resin is extruded into pellets obtained by cutting under cooling water; the pellets, which will be stored for subsequent conversion into items and parts. The conversion techniques used are those of plastics processing such as, in particular, injection if a cover is involved, and having very different wall thicknesses between the tear start zone and the support and fitting structural zone.

In embodiments of the invention, the rheology modified thermoplastic resin compositions can be extruded directly into sheet, or film, or any article, without having to go through a pelletization step.

In embodiments of the invention, the components of the rheology modified thermoplastic resin including any optional additives can be combined by melt blending.

In other embodiments of the present method, either method can include adding the rheology modified thermoplastic resin to a first extruder and then combining with the optional additives in a second extruder.

Regardless of which method is used, during the blending step, the polyolefin and interpolymer resin particles are typically intimately mixed by high shear mixing to form the rheology modified thermoplastic resin where the mixture includes a continuous polyolefin phase and an interpolymer resin particulate dispersed phase. The dispersed interpolymer resin particles are suspended or dispersed throughout the polyolefin continuous phase. The manufacture of the dispersed interpolymer resin particulate phase within the polyolefin continuous phase can require substantial mechanical input. Such input can be achieved using a variety of mixing means including extruder mechanisms where the materials are mixed under conditions of high shear until the appropriate degree of wetting, intimate contact and dispersion are achieved.

Not wishing to be limited to any single theory, in the present invention, polymer blends are used because of their superior properties when compared with those of the corresponding homopolymers. Part of the present invention is an improved understanding of the role that improved compatibility plays in the performance properties of a polymer blend. Chemical modification and copolymerization can allow the polymers to be more compatible with each other compared with the corresponding homopolymers. This points to the fact that the intermolecular interactions between chemically different polymers plays a major role. Basic thermodynamic considerations allow for an understanding of this problem in a more quantitative way.

Gibbs free energy is a function of the change in enthalpy, ($\Delta H$) (interaction energy) and the change in entropy ($\Delta S$), and provides a quantitative indication of the number of relative positions that the different molecules can occupy. For a spontaneous process to take place, this change has to be negative; i.e., $$\Delta G_{mix} = \Delta H - T\Delta S < 0$$

In the case of polyethylene and polystyrene, the value of $\Delta G_{mix}$ is positive because the interaction energy is not strong enough to overcome the entropy factors.

In particular embodiments as further described below, the thermoplastic resins and/or elastomers and interpolymer resin particles used to prepare the present rheology modified resin are selected such that the free energy of mixing for the thermoplastic resins, elastomers and interpolymer resin particles is very low (less than zero). In many embodiments of the present invention, the solubility parameter of the components of the thermoplastic resins and/or elastomers are sufficiently similar to the solubility parameters of the interpolymer resin particles to provide that the resulting thermodynamic interaction parameter values ($\chi$) for the admixture are less than 0.5.

The "free energy of mixing" is defined as $\Delta G = \Delta H - T\Delta S$, where G is the Gibb's free energy, H is enthalpy, S is entropy and T is temperature. In simple terms, when the free energy of mixing ($\Delta G$) of two components is a positive value, the two components are immiscible and will separate. For example, in the hypothetical instance where the thermoplastic resins and/or elastomers and interpolymer resin particles are substantially immiscible components, they will tend to partition, which can minimize any desirable rheology modification of the thermoplastic resins and/or elastomers. Also, $\Delta G$ for a binary mixture containing a component 1 and a component 2 may be defined by the following equation:

$$\Delta G = RT[(n_1 \ln X_1 + n_2 \ln X_2) + \chi n_1 X_2]$$

where R is the gas constant, T is temperature, "x" is the volume fraction of component 1 or 2, n is the number of particles, and $\chi$ ("chi") represents the thermodynamic interaction parameter. The thermodynamic interaction parameter ($\chi$ or "chi") is defined as the difference in the energy of mixing of components 1 and 2. This can be represented by the following equation:

$$\chi = (\Delta E_{mix}/RT) V_m$$

where $V_m$ is the average molar volume ("reference segment volume") and R and T are defined above. "Chi" may also be defined as the difference in solubility parameter (SP) of two materials.

$$\chi = V_m (\delta_1 - \delta_2)^2 / RT$$

where $\delta$ is the Hildebrand solubility parameter. The solubility parameter may be computed from a value known as the cohesive energy density ("ced") of a material. The "ced" is related to the heat of vaporization of a material, that is, how much energy is required to remove a single molecule from the bulk. For polymeric systems where the assumption that the entropy of mixing is exceedingly small, the free energy expressions reduce to the energy of mixing itself, that is $\Delta G = \Delta H$, and a theoretical critical point exists where two materials become immiscible (phase separate) when "chi" is greater than 0.5. For regular solutions, (low molecular weight species) this critical point has a value of 2.0. So in the present invention, it is desirable that the value of "chi" for the thermoplastic resins and/or elastomers and interpolymer resin particles mixture is less than 0.5.

To summarize, from first principles, the "ced" for a bulk material can be computed. The "ced" is directly related to the solubility parameter ($\delta$) as indicated above. The thermodynamic interaction parameter "chi" ($\chi$) can be computed from the differences in the solubility parameter ($\delta$) for each of the two materials. "Chi" along with relative fractions of materials in a mixture may be used to compute the free energy of mixing ($\Delta G$). If $\Delta G$ is a negative value, the mixture is thermodynamically stable and phase separation should not occur. Critical points for this condition are values of "chi" of 0.5 and less for higher molecular weight materials such as the polymeric components of the thermoplastic resins and/or elastomers and interpolymer resin particles. See as a non-limiting example at page 10, line 35 to page 11, line 27 of U.S. Pat. No. 7,329,468.

In embodiments of the invention, the difference between the solubility parameter of the interpolymer resin particles and the solubility parameter of the thermoplastic resins and/or elastomers is not more than 1 $(cal/cm^3)^{1/2}$ [0.5 $(J/cm^3)^{1/2}$], in some cases not more than 0.75 $(cal/cm^3)^{1/2}$ [0.366 $(J/cm^3)^{1/2}$], and in other cases not more than 0.75 $(cal/cm^3)^{1/2}$ [0.25 $(J/cm^3)^{1/2}$].

In embodiments of the invention, the difference between the solubility parameters of the interpolymer resin particles and the solubility parameter of the thermoplastic resins and/or elastomers is not more than 1.5 $(cal/cm^3)^{1/2}$ [0.366 $(J/cm^3)^{1/2}$], in some cases not more than 1.3 $(cal/cm^3)^{1/2}$ [0.366 $(J/cm^3)^{1/2}$], and in other cases not more than 1.2 $(cal/cm^3)^{1/2}$ [0.25 $(J/cm^3)^{1/2}$].

In embodiments of the invention, the difference between the solubility parameters of the components of a thermoplastic resins/elastomer mixture and the solubility parameter of the interpolymer resin particles is not more than 1.2 $(cal/cm^3)^{1/2}$, in some cases not more than 1.0 $(cal/cm^3)^{1/2}$, and in other cases not more than 0.75 $(cal/cm^3)^{1/2}$ The exact solubility parameter of a particular polymer can vary based on its exact composition, amount of branching, molecular weight and molecular weight distribution. As such, the solubility parameter ($\delta$) for the interpolymer resin particles used in the present invention can be at least about 7.7 $(cal/cm^3)^{1/2}$ [3.76 $(J/cm^3)^{1/2}$], in some cases at least about 7.75 $(cal/cm^3)^{1/2}$ [3.78 $(J/cm^3)^{1/2}$] and in other cases at least about 7.8 $(cal/cm^3)^{1/2}$ [3.8 $(J/cm^3)^{1/2}$] and can be up to about 9.3 $(cal/cm^3)^{1/2}$ [4.54 $(J/cm^3)^{1/2}$], in some cases up to about 9.2 $(cal/cm^3)^{1/2}$ [4.49 $(J/cm^3)^{1/2}$] and in other cases up to about 9.1 $(cal/cm^3)^{1/2}$ [4.44 $(J/cm^3)^{1/2}$]. The solubility parameter ($\delta$) for the interpolymer resin particles used in the present invention can be any value or range between any of the values recited above.

The solubility parameter ($\delta$) for the thermoplastic resins used in the present invention can be at least about 7.7 $(cal/cm^3)^{1/2}$ [3.76 $(J/cm^3)^{1/2}$], in some cases at least about 7.75 $(cal/cm^3)^{1/2}$ [3.78 $(J/cm^3)^{1/2}$] and in other cases at least about 7.8 $(cal/cm^3)^{1/2}$ [3.8 $(J/cm^3)^{1/2}$] and can be up to about 8.4 $(cal/cm^3)^{1/2}$ [4.1 $(J/cm^3)^{1/2}$], in some cases up to about 8.3 $(cal/cm^3)^{1/2}$ [4.05 $(J/cm^3)^{1/2}$] and in other cases up to about 8.2 $(cal/cm^3)^{1/2}$ [4 $(J/cm^3)^{1/2}$]. In particular embodiments, the solubility parameter ($\delta$) for the thermoplastic resins can be 7.9 $(cal/cm^3)^{1/2}$ [3.85 $(J/cm^3)^{1/2}$] or 8.1 $(cal/cm^3)^{1/2}$ [3.95 $(J/cm^3)^{1/2}$]. The solubility parameter ($\delta$) for the thermoplastic resins used in the present invention can be any value or range between any of the values recited above.

The solubility parameter ($\delta$) for the elastomers used in the present invention can be at least about 8.3 $(cal/cm^3)^{1/2}$ [4.05 $(J/cm^3)^{1/2}$] and in some cases at least about 8.4 $(cal/cm^3)^{1/2}$ [4.1 $(J/cm^3)^{1/2}$] and can be up to about 8.6 $(cal/cm^3)^{1/2}$ [4.2 $(J/cm^3)^{1/2}$] and in some cases up to about 8.5 $(cal/cm^3)^{1/2}$ [4.15 $(J/cm^3)^{1/2}$]. The solubility parameter ($\delta$) for the elastomers used in the present invention can be any value or range between any of the values recited above.

The solubility parameter ($\delta$) for the styrenic polymers of the interpolymer resin particles used in the present invention can be at least about 8.5 $(cal/cm^3)^{1/2}$ [4.15 $(J/cm^3)^{1/2}$], in some cases at least about 8.6 $(cal/cm^3)^{1/2}$ [4.2 $(J/cm^3)^{1/2}$] and in other cases at least about 8.7 $(cal/cm^3)^{1/2}$ [4.24 $(J/cm^3)^{1/2}$] and can be up to about 9.3 $(cal/cm^3)^{1/2}$ [4.54 $(J/cm^3)^{1/2}$], in some cases up to about 9.2 $(cal/cm^3)^{1/2}$ [4.49 $(J/cm^3)^{1/2}$] and in other cases up to about 9.1 $(cal/cm^3)^{1/2}$ [4.44 $(J/cm^3)^{1/2}$]. In particular embodiments, the solubility parameter ($\delta$) for the styrenic polymers can be 9 $(cal/cm^3)^{1/2}$ [4.39 $(J/cm^3)^{1/2}$] or 8.8 $(cal/cm^3)^{1/2}$ [4.29 $(J/cm^3)^{1/2}$]. The solubility parameter ($\delta$) for the styrenic polymers used in the present invention can be any value or range between any of the values recited above.

The solubility parameter ($\delta$) for the polyolefin of the interpolymer resin particles used in the present invention can be at least about 7.7 $(cal/cm^3)^{1/2}$ [3.76 $J/cm^3)^{1/2}$], in some cases at least about 7.75 $(cal/cm^3)^{1/2}$ [3.78 $(J/cm^3)^{1/2}$] and in other cases at least about 7.8 $(cal/cm^3)^{1/2}$ [3.8 $(J/cm^3)^{1/2}$] and can be up to about 8.4 $(cal/cm^3)^{1/2}$ [4.1 $(J/cm^3)^{1/2}$], in some cases up to about 8.3 $(cal/cm^3)^{1/2}$ [4.05 $(J/cm^3)^{1/2}$] and in other cases up to about 8.2 $(cal/cm^3)^{1/2}$ [4 $(J/cm^3)^{1/2}$]. In particular embodiments, the solubility parameter ($\delta$) for the polyolefin can be 7.9 $(cal/cm^3)^{1/2}$ [3.85 $(J/cm^3)^{1/2}$] or 8.1 $(cal/cm^3)^{1/2}$ [3.95 $(J/cm^3)^{1/2}$]. The solubility parameter ($\delta$) for the polyolefins used in the present invention can be any value or range between any of the values recited above.

In embodiments of the invention, the thermodynamic interaction parameter "chi" ($\chi$), calculated for the blend of thermoplastic resin (and optional elastomers) and interpolymer resin particles can be up to 0.5, in many cases less than 0.5, in some cases not more than 0.4 and in other cases not more than 0.3.

The present rheology modified thermoplastic resins can be used in applications such as blown film, cast film, solid sheets, injection molded articles, thermoformed articles, blow molded articles, rotomolded articles, compression molded articles, foamed articles and functional films. Under most processing conditions, the rheology modified thermoplastic resin provides good throughput rates, a good balance between melt viscosity and elasticity properties, and good processibility while maintaining desirable physical properties such as strength properties, heat seal properties, and optical properties that meet the needs of the end user.

As a non-limiting example, the low shear viscosity of the rheology modified thermoplastic resin is sufficiently high under normal processing conditions to provide thermoformed articles that are more uniform and are stronger than articles made with the same polyolefin in the rheology modified thermoplastic resin and not containing the present interpolymer resin particles.

In another non-limiting example, the rheology modified thermoplastic resin provides a more desirable balance of viscous and elastic properties under processing and demonstrates better processibility and higher throughput rates than the same polyolefin as in the rheology modified thermoplastic resin and not containing the present interpolymer resin particles.

Thus, the rheology modified thermoplastic resin provides an adequate balance between viscous and elastic properties and provides good processibility while maintaining good physical properties such as strength properties, heat seal properties, and optical properties.

In particular embodiments of the invention, the rheology modified thermoplastic resin provides improved bubble stability properties in blown film applications compared to blown films not containing the dispersed interpolymer resin.

Not wishing to be bound by any particular theory, it is believed that the dispersed interpolymer resin particles act to improve the rheological properties of the thermoplastic continuous phase.

Prior art attempts to tailor the melt strength of a polyolefin has typically included increasing the number of long chain branches and/or high molecular tails in the polymer. However, this structural change will inherently affect the physical properties of the resin and it may no longer be suitable for a desired application.

In the present invention, a polyethylene-polystyrene interpolymer resin is used and not only provides the advantages of compatibilizing and reinforcing the thermoplastic resin, but also increasing the melt strength of the thermoplastic resins and consequently, offering wider processing windows for resins that are normally suitable for a limited number of processes, and open up opportunities for resins that were not and potentially delivering new materials.

The polyethylene-polystyrene interpolymer resin has a unique melt rheology that makes it an ideal rheology modifier. In many instances, the tan (δ) (the ratio of the loss modulus over the elastic modulus) of the polyethylene-polystyrene interpolymer resin is below 1 for all stresses and demonstrates excellent shear thinning properties. This indicates that the material acts mostly as an elastic component over a broad shear range and can significantly contribute to the modification of the rheology of certain carrier thermoplastic resins, non-limiting examples being polyolefins and SBC based polymers.

In embodiments of the invention, when the polyethylene-polystyrene interpolymer resin is added to a thermoplastic, and in particular, a polyolefin resin, the melt strength is increased. Even when the thermoplastic is suitable for foaming applications by itself, addition of the polyethylene-polystyrene interpolymer resin increases the processing window and higher throughput rates can be achieved with the resulting rheology modified thermoplastic resin.

In particular embodiments of the invention, the rheology modified thermoplastic resins according to the invention demonstrate a haul off force that is at least about 5% higher, in some cases at least about 10% higher, and in other cases at least about 15% higher than the haul off force of the thermoplastic resin without the interpolymer resin particles.

In other particular embodiments of the invention, the rheology modified thermoplastic resins according to the invention have a melt strength at least about 10% higher, in some cases at least about 20% higher and in other cases at least about 25% higher than the melt strength of the thermoplastic resin without the interpolymer resin particles.

In these embodiments, haul off force can be determined using a Rheometric Scientific SR5 rheometer equipped with heated parallel plates with a glass chamber placed around the sample and plates with 50 cc/min $N_2$ flow. The Samples are trimmed at a gap of 1.1 mm and then set to 1.00 mm for testing. Testing includes a frequency sweep at 190° C., followed by a temperature ramp from 140° C. to 230° C. The haul-off force is recorded and the data of the average force at each speed are fitted with an exponential equation: $F=A*Exp(-v/B)+C$ where F and v are the haul-off force and speed; A, B, C are constants and can be obtained by LLS fitting. The value of C is used as the melt strength result for the sample.

In further particular embodiments of the invention, the rheology modified thermoplastic resins according to the invention have a spiral flow that is at least about 30% higher, in some cases at least about 40% higher and in other cases about 50% higher than the spiral flow of the thermoplastic resin without the interpolymer resin particles.

Spiral Flow molding can be performed on a 33 ton Vista Sentry injection molding machine (Cincinnati Milacron, Batavia, Ohio) with a 50 gram maximum shot-size. The sample material is introduced into the machine and 15 "shots" are run and discarded. This allows for the temperature and pressure to equilibrate and to ensure homogenous mixing of the resin in the molding machine barrel. After the 15 shots are molded and discarded, 5 shots are run and measured. The average flow length of the 5 shots are reported. Machine parameters and setpoints are: Temperature, 420° F.; Pressure, 2200 psi (max); and Inject Time, 10 seconds.

The present invention will further be described by reference to the following examples. The following examples are merely illustrative of the invention and are not intended to be limiting. Unless otherwise indicated, all percentages are by weight.

EXAMPLES

In the following examples, the interpolymer resins were prepared as described in Example 1 of U.S. Pat. No. 7,411,024. The compounded rheology modified thermo-plastic resin samples were prepared by compounding polyethylene on a Leistritz twin screw extruder (co-rotating, inter-meshing, 35/1-L/D). Dry blends containing the interpolymer resins (5%-30% wt.) and (70%-95%) polyethylene were prepared in a ribbon blender prior to compounding. Blends were processed at temperatures between 190 and 230° C. In some cases, vacuum was pulled from one or more of the ports to extract unnecessary volatiles or by-products from the mixtures. The materials were strand cut/pelletized after being cooled with flowing tap water.

Example 1

The following materials were prepared and melt blended as described above in the ratios in the following table. Measurements were made using a Rheometric Scientific SR5 rheometer equipped with heated parallel plates with a glass chamber placed around the sample and plates with 50 cc/min $N_2$ flow. Samples were trimmed at a gap of 1.1 mm and then set to 1.00 mm for testing. Testing included a frequency sweep at 190° C., followed by a temperature ramp from 140° C. to 230° C.

Polyethylene (P) Samples:

P1—LF 219 (low density polyethylene available from NOVA Chemicals Corp., δ~7.8 $(cal/cm^3)^{0.5}$)

P2—LF 218 (linear low density polyethylene available from NOVA Chemicals, δ~7.9 $(cal/cm^3)^{0.5}$)

P3—19G (high density polyethylene available from NOVA Chemicals, δ~8.0 $(cal/cm^3)^{0.5}$))

P4—HDPE 5502 (high density polyethylene from Chevron Phillips, δ~8.0 $(cal/cm^3)^{0.5}$))

P5—FP 120C (linear low density polyethylene available from NOVA Chemicals, δ~7.9 $(cal/cm^3)^{0.5}$)

P6—FPs 117C (linear low density polyethylene available from NOVA Chemicals, δ~7.9 $(cal/cm^3)^{0.5}$)

Polyethylene-polystyrene interpolymer resins (PES):

PES1—30% EVA/70% (96.7/3.3 styrene/butyl acrylate copolymer), δ~9.0 $(cal/cm^3)^{0.5}$ PES2—30% EVA/70% (90/10 styrene/butyl acrylate copolymer), δ~9.1 $(cal/cm^3)^{0.5}$ PES 3—70 wt. % ethylene-vinyl acetate copolymer (EVA)/30 wt. % polystyrene, δ~8.4 $(cal/cm^3)^{0.5}$ PES4—50% EVA/50% polystyrene, δ~8.7 $(cal/cm^3)^{0.5}$ PES5—30% EVA/70% polystyrene, δ~9.0 $(cal/cm^3)^{0.5}$ G'/G"=crossover point frequency (rads/sec)

CV=complex viscosity ($10^4$ Pascal sec)

F=frequency (rads/sec)

Tδ=Tan(δ)

ZSV=zero shear viscosity ($10^4$ Pascal·sec)

| Sample | P | PES | G'/G" | ZSV | F | Tδ | CV | F | Tδ | CV |
|---|---|---|---|---|---|---|---|---|---|---|
| A | 100% P1 | — | 21.7 | 1.53 | 0.1 | 3.04 | 9.51 | 100 | 1.01 | 0.402 |
| B | — | 100% PES1 | — | 24.1 | 0.1 | 0.94 | 101 | 100 | 0.59 | 1.10 |
| C | 97% P1 | 3% PES1 | 22.9 | 1.48 | 0.1 | 2.84 | 8.91 | 100 | 0.99 | 0.366 |
| D | 95% P1 | 5% PES1 | 15.6 | 1.71 | 0.1 | 2.59 | 9.87 | 100 | 0.99 | 0.372 |
| E | 90% P1 | 10% PES1 | 11.0 | 1.83 | 0.1 | 2.58 | 10.6 | 100 | 0.96 | 0.394 |
| F | 80% P1 | 20% PES1 | 8.57 | 2.08 | 0.1 | 2.5 | 12.0 | 100 | 0.94 | 0.426 |
| G | 97% P1 | 3% PES2 | 16.7 | 1.57 | 0.1 | 2.77 | 9.25 | 100 | 0.99 | 0.370 |
| H | 95% P1 | 5% PES2 | 13.5 | 1.85 | 0.1 | 2.66 | 10.7 | 100 | 0.99 | 0.408 |
| I | 90% P1 | 10% PES2 | 11.1 | 2.09 | 0.1 | 2.62 | 12.2 | 100 | 0.99 | 0.458 |
| J | 80% P1 | 20% PES2 | 8.21 | 2.32 | 0.1 | 2.33 | 12.7 | 100 | 0.95 | 0.438 |
| K | 90% P1 | 10% PES3 | 18.9 | 1.71 | 0.1 | 2.8 | 10.2 | 100 | 1.01 | 0.411 |
| L | 90% P1 | 10% PES4 | 60.5 | 1.97 | 0.1 | 2.83 | 11.7 | 100 | 1.02 | 0.478 |
| M | 100% P3 | — | — | — | 0.1 | 5.93 | 10.8 | 100 | 1.34 | 0.115 |
| N | 90% P3 | 10% PES1 | — | — | 0.1 | 4.99 | 13.3 | 100 | 1.24 | 0.119 |
| O | 100% P2 | — | — | — | 0.1 | 20.9 | 4.97 | 100 | 1.73 | 1.17 |
| P | 90% P2 | 10% PES1 | — | — | 0.1 | 11.7 | 6.58 | 100 | 1.57 | 1.23 |
| Q | 45% P2 45% P3 | 10% PES1 | — | — | 0.1 | 6.34 | 10.0 | 100 | 1.4 | 1.26 |
| R | 50% P2 50% P3 | — | — | — | 0.1 | 8.84 | 7.71 | 100 | 1.52 | 1.20 |

Herein, it is apparent from the data presented in Example 1, the increase in zero shear viscosity, most notably the shift of G'/G" crossover points, the increase in complex viscosity and the increase in tan (δ), that the interpolymers perform as processing aids and positively influence the rheology of the foaming resins. In addition, the data suggests that incorporation of interpolymers described in this invention may broaden the foaming processability window, suggesting a more forgiving foaming process. Finally, it appears as the interpolymer resins also act as compatibilizers, as exemplified by the comparison between Samples Q and R, where PES1 enhances the rheology of the blend of two incompatible LLDPE (P2) and HDPE (P3) materials versus the blend of the same two incompatible materials without PES1.

Example 2

Samples were prepared as described in Example 1 and the melt strength was determined at 190° C.

| Sample | P | PES | Melt Strength (cN) |
|---|---|---|---|
| S | 100% P1 | — | 11.4 |
| T | — | 100% PES1 | 55.4 |
| U | 50% P1 | 50% PES1 | 26.0 |

The data show that the melt strength of the polyethylene was too low, which leads to blowout in film applications. The melt strength of the Polyethylene-polystyrene interpolymer resin was too high for processing. The blend provides a melt strength that allows for no blowout during blown film operations, good processibility, and uniform foaming and or thermoforming.

Example 3

The following blends were prepared as described above and tested on a Rosand RH7 capillary rheometer. Sample melts at 190° C. were extruded through a 1 mm diameter die (L/D=16:1). The piston speed was 1 mm/min, and the haul-off speed started from 1 m/min and increased 1 m/min steps. The haul-off force is recorded and the data of the average force at each speed are fitted with an exponential equation: $F=A*Exp(-v/B)+C$ where F and v are the haul-off force and speed; A, B, C are constants and can be obtained by LLS fitting. The value of C is used as the CHO melt strength result for the sample. Since haul-off force is proportional to melt strength, the data show that in the case of HDPE, addition of said interpolymer will efficiently modify the blend rheology and improve melt elasticity of the base resin.

| | Haul-off Force (cN) | | | |
|---|---|---|---|---|
| Haul-off Speed (m/min) | 100% P4 | 90/10 P4/PES5 | 85/15 P4/PES5 | 80/20 P4/PES5 |
| 1 | 4.19 | 4.27 | 4.41 | 4.48 |
| 5 | 4.20 | 4.5 | 4.64 | 4.88 |
| 10 | 4.34 | 4.56 | 4.78 | 5.06 |
| G'/G" (rads/sec) | 8.11 | 6.23 | 5.60 | 4.26 |

Example 4

The following blends were prepared and tested as described above.

| Haul-off Speed (m/min) | Haul-off Force (cN) | | | |
|---|---|---|---|---|
| | 100% P1 | 95/5 P1/PES1 | 90/10 P1/PES1 | 80/20 P1/PES1 |
| 1 | 2.41 | 2.75 | 3.04 | 3.19 |
| 2 | 3.94 | 4.00 | 4.14 | 4.35 |
| 3 | 4.25 | 4.34 | 4.65 | 4.68 |

| Haul-off Speed (m/min) | Haul-off Force (cN) | | | |
|---|---|---|---|---|
| | 100% P1 | 95/5 P1/PES2 | 90/10 P1/PES2 | 80/20 P1/PES2 |
| 1 | 2.41 | 2.98 | 3.45 | 3.71 |
| 2 | 3.94 | 4.28 | 4.86 | 4.90 |
| 3 | 4.25 | 4.66 | 5.19 | 5.22 |

The melt flow characteristics of LDPE polymers were enhanced through the incorporation of the interpolymers according to the invention. The results shown in this example demonstrate a greater haul-off force for blends including the present interpolymer resin compared to the virgin polyolefin, hence a higher melt strength.

Example 5

Samples were prepared as described in Example 1 and Spiral Flow molding was performed on a 33 ton Vista Sentry injection molding machine (Cincinnati Milacron, Batavia, Ohio) with a 50 gram maximum shot-size. The sample material was introduced into the machine and 15 "shots" were run and discarded. This was to allow for temperature and pressure equilibrium and to ensure homogenous mixing of the resin in the molding machine barrel. After the 15 shots were molded and discarded, 5 shots were run and measured. The average flow length of these 5 shots was reported. Machine parameters and setpoints were: Temperature, 420° F.; Pressure 2200 psi (max); and Inject Time, 10 seconds. The SEBS was CALPRENE® H-6120 (Dynasol Elastomers, S. A., Madrid, Spain) and the SEEPS was Septon® 4055 (Kuraray Co., Ltd., Okayama, Japan). All percentages are by weight.

| | Interpolymer Resin (wt %) | Elastomer (wt. %) | Sprial Flow In. (cm) | Increase (%) |
|---|---|---|---|---|
| V | — | SEBS (100%) | 20.0 | — |
| W | PES 1 (20%) | SEBS (80%) | 33.3 | 67 |
| X | PES 1 (40%) | SEBS (60%) | 48.4 | 142 |
| Y | PES 1 (60%) | SEBS (40%) | 51.1 | 156 |
| Z | PES 4 (40%) | SEBS (60%0) | 36.2 | 81 |
| AA | PES 4 (60%) | SEBS (40%) | 44.1 | 121 |
| AB | PES 3 (60%) | SEBS (40%) | 44.5 | 123 |
| AC | — | SEEPS | 30.6 | — |
| AD | PES 1 (20%) | SEEPS (80%) | 59.4 | 94 |
| AE | PES 1 (40%) | SEEPS (60%) | 58.7 | 92 |
| AF | PES 1 (60%) | SEEPS (40%) | 51.4 | 68 |
| AG | PES 4 (40%) | SEEPS (60%) | 49.8 | 63 |
| AH | PES 4 (60%) | SEEPS (40%) | 49.5 | 62 |
| AI | PES 3 (60%) | SEEPS (40%) | 42.2 | 38 |

The combination of the present interpolymer resin particles with SEBS or SEEPS significantly increased the spiral flow, hence its rheological properties, of the blend compared to SEBS or SEEPS alone. The increased flow, or enhanced processing characteristics, offers an opportunity for faster cycle times, more intricate design and thinner parts.

Example 6

This example demonstrates improved uniformity of molded parts made using the present rheology modified thermoplastic resin. Resin samples were prepared as described in Example 1.

Sheet were extruded using a 4.5 inch 32-1 extruder (Welex Inc., Blue Bell. PA) running @ 600 lbs./hr to produce 0.050" to 0.063" sheet comprised of the materials in the table below. The heat profile on this machine ranges from 350° F. to 450° F.

Deep-draw trays were produced at Tray-Pak on a DT/Sencorp trim in place thermoformer (Sencorp Systems, Inc. Hyannis, Mass.) running 4.5 to 6.0-shots/per-minute on a nine cavity mold. The heat profile on this machine ranges from 950° F. to 1000° F. The speed (cylinders per minute) and sheet thickness (ST) is indicated in the table. The average bottom thickness (BT), bottom corner thickness (BCT) and corner side wall thickness (CSWT) and standard deviation (SD) were based on nine measurements.

| | P4 (wt %) | PES 5 (wt %) | Speed (cpm) | ST (mil) | Weight (g) | BT (mil) | BCT (mil | CSWT (mil) |
|---|---|---|---|---|---|---|---|---|
| AJ | 100 | 0 | 4.5 | 0.06 | 43.3 SD 2.3 | 0.046 SD 0.010 | 0.030 SD 0.010 | 0.013 SD 0.003 |
| AK | 90 | 10 | 4.5 | 0.06 | 45.6 SD 1.6 | 0.047 SD 0.004 | 0.031 SD 0.004 | 0.019 SD 0.001 |
| AL | 85 | 15 | 4.5 | 0.06 | 45.8 SD 2.0 | 0.042 SD 0.004 | 0.026 SD 0.004 | 0.014 SD 0.001 |
| AM | 80 | 20 | 4.5 | 0.06 | 46.1 SD 1.8 | 0.042 SD 0.004 | 0.025 SD 0.002 | 0.015 SD 0.001 |
| AN | 80 | 20 | 4.5 | 0.06 | 45.9 SD 1.4 | 0.044 SD 0.004 | 0.028 SD 0.004 | 0.013 SD 0.001 |
| AO | 90 | 10 | 6 | 0.053 | 41.5 SD 1.1 | 0.034 SD 0.008 | 0.022 SD 0.007 | 0.017 SD 0.003 |
| AP | 90 | 10 | 6 | 0.050 | 39.0 SD 0.8 | 0.037 SD 0.006 | 0.029 SD 0.005 | 0.016 SD 0.002 |
| AQ | 85 | 15 | 6 | 0.050 | 39.5 SD 0.7 | 0.042 SD 0.002 | 0.029 SD 0.005 | 0.012 SD 0.001 |

The data demonstrate the improved uniformity in molded parts obtained using the present rheology modified thermoplastic resin containing interpolymer resin particles compared with using a thermoplastic resin alone.

Example 7

Samples were prepared as described in Example 1 and a capillary test was done on a Kayeness LCR5000 capillary rheometer at 190° C. Shear viscosity ($\eta$) was measured at the indicated shear rates (1/s); a 60 mil diameter die with 120° entrance angle and 20:1 L/D was used. The materials tested were AR (100% P4); AS (100% PES 1); AT (80/20 w/w P4/PES 1); AU (85/15 w/w P4/PES 1); and AV (90/10 P4/PES 1).

| Shear Rate (1/s) | AR η (Pa·S) | AS η (Pa·S) | AT η (Pa·S) | AU η (Pa·S) | AV η (Pa·S) |
|---|---|---|---|---|---|
| 1000 | 374 | 297 | 365 | 369 | 369 |
| 701 | 465 | 390 | 456 | 460 | 461 |
| 502 | 573 | 491 | 563 | 568 | 569 |
| 299 | 789 | 723 | 772 | 785 | 787 |
| 199 | 1010 | 1000 | 1009 | 1012 | 1012 |
| 100 | 1511 | 1723 | 1532 | 1524 | 1524 |
| 58 | 2037 | 2563 | 2088 | 2070 | 2067 |
| 21 | 3589 | 5612 | 3792 | 3699 | 3682 |
| 10 | 5163 | 9260 | 5383 | 5333 | 5299 |
| 3.4 | 8634 | 19147 | 9700 | 9396 | 9345 |

This data set demonstrates excellent shear thinning processability of the polyolefin/interpolymer blends compared to the virgin polyolefin resin, which is both beneficial for polyolefin sheet extrusion, blow molding and thermoforming.

Example 8

Samples were prepared as in Examples 1 and 3 except that polypropylene (PP, P4G2k-152, Flint Hills) was used instead of polyethylene. Sample AV was 100% PP and sample AU was 85% PP and 15% PES 5.

Measurements were made as described in Example 3 using a Rheometric Scientific SR5 rheometer equipped with heated parallel plates with a glass chamber placed around the sample and plates with 50 cc/min $N_2$ flow. Samples were trimmed at a gap of 1.1 mm and then set to 1.00 mm for testing. Testing included a frequency sweep at 190° C., followed by a temperature ramp from 140° C. to 230° C.

| Haul Off Speed (m/min) | AV Stretch Ratio | AV Haul Off Force (cN) | AU Stretch Ratio | AU Haul Off Force (cN) |
|---|---|---|---|---|
| 1 | 4.2 | 1.57 | 4.2 | 1.88 |
| 2 | 8.9 | 1.70 | 8.9 | 2.19 |
| 3 | 13.1 | 1.73 | 13.1 | 2.27 |
| 4 | 17.8 | 1.80 | 17.8 | 2.37 |
| 5 | 22.0 | 1.79 | 22.0 | 2.45 |
| 6 | 26.7 | 1.81 | 26.7 | 2.51 |
| 7 | 30.9 | 1.87 | 30.9 | 2.54 |
| 8 | 35.6 | 1.85 | 35.6 | 2.57 |
| 9 | 39.8 | 1.86 | 39.8 | 2.58 |
| 10 | 44.5 | 1.89 | 44.5 | 2.59 |
| Mean Melt Strength (cN) | 1.8 | | 2.4 | |

| | AV | | | AU | | |
|---|---|---|---|---|---|---|
| Ω (rad/s) | G' (Pa) | G" (Pa) | Tan (δ) (Pa·s) | G' (Pa) | G" (Pa) | Tan (δ) (Pa·s) |
| 0.05 | 239 | 931 | 3.9 | 163 | 763 | 4.69 |
| 0.26 | 1389 | 3158 | 2.27 | 1076 | 2721 | 2.53 |
| 0.97 | 4584 | 7201 | 1.57 | 3770 | 6398 | 1.7 |
| 2.59 | 9738 | 11911 | 1.22 | 8320 | 10881 | 1.31 |
| 5.00 | 15086 | 15786 | 1.05 | 13179 | 14658 | 1.11 |
| 9.65 | 22326 | 20118 | 0.90 | 19920 | 18966 | 0.95 |
| 25.9 | 37320 | 26836 | 0.72 | 34076 | 25807 | 0.76 |
| 50.00 | 50335 | 30933 | 0.61 | 46618 | 30066 | 0.64 |
| 96.54 | 66549 | 34447 | 0.52 | 62381 | 33607 | 0.54 |

The haul-off force data indicate that polypropylene rheology was modified and melt strength was improved by 30% through addition of the present interpolymer resin.

The data shows higher tan (δ) values for the interpolymer containing blends compared to the pure thermoplastic at equivalent frequencies during a frequency sweep, allowing for faster extrusion rates, faster thermoforming cycle times and better quality parts.

Example 9

Samples were prepared as in Example 1 except that polyethylene rotomolding resins RM341 and RM539 (NOVA Chemicals Inc.) were used with PES1. Density (ASTM D792), Impact (DYNATUP ASTM 3763), Tensile (yield strength) (ASTM D638), Flex (flexural modulus) (ASTM D790), and melt strength at 150° C. were determined using the method described in Example 3. For each sample, an ESCR condition B result of >1,000 hours was obtained (ASTM D1693).

|    | RM341 (wt. %) | RM539 (wt. %) | PES1 (wt. %) | Density (g/cm³) | Impact (lb.) | Tensile (MPa) | Flex (MPa) | Melt (cN) |
|----|---------------|---------------|--------------|-----------------|--------------|---------------|------------|-----------|
| AW | 100           | —             | —            | 0.9412          | 1662         | 21.8          | 877        | 0.80      |
| AX | 99            | —             | 1            | 0.9420          | 1587         | 21.2          | 890        | 0.89      |
| AY | 97            | —             | 3            | 0.9438          | 1503         | 21.2          | 928        | 0.90      |
| AZ | 95            | —             | 5            | 0.9441          | 1430         | 21.2          | 918        | 1.08      |
| BA | 90            | —             | 10           | 0.9477          | 1454         | 20.6          | 909        | 1.87      |
| BB | —             | 100           | —            | 0.9331          | 1488         | 18.7          | 742        | 0.67      |
| BC | —             | 99            | 1            | 0.9394          | 1557         | 19.3          | 764        | 0.59      |
| BD | —             | 97            | 3            | 0.9410          | 1447         | 19.2          | 785        | 0.65      |
| BE | —             | 95            | 5            | 0.9419          | 1525         | 19.3          | 772        | 0.67      |
| BF | —             | 90            | 10           | 0.9450          | 1520         | 19.0          | 848        | 0.84      |

The data indicate that melt strength increases with interpolymer content while physical properties of the blends are not adversely impacted with the presence of interpolymer resin. Impact properties do not appear to change with increasing interpolymer resin content in the rotomolding grade polyethylene, tensile properties decrease slightly with increasing interpolymer content, while flexural modulus increases with interpolymer content.

Example 10

Samples were prepared as in Example 1 except that polyethylene blow molding resins HB-W952-A ("W952") and HB-L354-A ("L354" both from NOVA Chemicals Inc.) were used with PES1 and PES2.

|                | BG 100% L354 | | | BH 90% L354/ 10% PES1 | | | BH 85% L354/ 15% PES1 | | |
|----------------|--------------|---------|---------|---------|---------|---------|---------|---------|---------|
| $\Omega$ (rad/s) | G' (Pa)    | G'' (Pa) | Tan (δ) (Pa·s) | G' (Pa) | G'' (Pa) | Tan (δ) (Pa·s) | G' (Pa) | G'' (Pa) | Tan (δ) (Pa·s) |
| 0.05           | 1190         | 1991    | 1.69    | 1608    | 2374    | 1.48    | 1784    | 2482    | 1.39    |
| 0.26           | 3872         | 5420    | 1.40    | 4882    | 6193    | 1.27    | 5128    | 6363    | 1.24    |
| 0.97           | 9103         | 11099   | 1.22    | 10881   | 12277   | 1.13    | 11332   | 10596   | 1.10    |
| 2.59           | 16492        | 18257   | 1.11    | 19186   | 19720   | 1.03    | 19795   | 19902   | 1.01    |
| 5.00           | 24115        | 24958   | 1.04    | 27492   | 26494   | 0.96    | 28283   | 26614   | 0.94    |
| 9.65           | 34800        | 33529   | 0.96    | 38984   | 35052   | 0.90    | 39846   | 34932   | 0.88    |
| 25.9           | 59101        | 50233   | 0.85    | 64526   | 51340   | 0.80    | 65288   | 50677   | 0.78    |
| 50.00          | 83256        | 63622   | 0.76    | 89195   | 64080   | 0.72    | 89657   | 62916   | 0.70    |
| 96.54          | 116250       | 7870    | 0.67    | 122470  | 77294   | 0.63    | 121730  | 75202   | 0.62    |
| Melt Strength (cN) | | 8.21 | | | 9.59 | | | 10.04 | |

|                | BI 100% W952 | | | BJ 90% W952/ 10% PES1 | | | BK 85% w952/ 15% PES1 | | |
|----------------|--------------|---------|---------|---------|---------|---------|---------|---------|---------|
| $\Omega$ (rad/s) | G' (Pa)    | G'' (Pa) | Tan (δ) (Pa·s) | G' (Pa) | G'' (Pa) | Tan (δ) (Pa·s) | G' (Pa) | G'' (Pa) | Tan (δ) (Pa·s) |
| 0.05           | 3521         | 4497    | 1.28    | 3988    | 4665    | 1.17    | 4153    | 4719    | 1.14    |
| 0.26           | 9529         | 10789   | 1.13    | 10301   | 10729   | 1.04    | 10531   | 10801   | 1.03    |
| 0.97           | 20053        | 20372   | 1.07    | 20899   | 19827   | 0.95    | 21206   | 12656   | 0.94    |
| 2.59           | 34160        | 31464   | 0.92    | 34643   | 30119   | 0.87    | 34884   | 29971   | 0.86    |
| 5.00           | 47947        | 41228   | 0.86    | 47881   | 38904   | 0.81    | 48160   | 38656   | 0.80    |
| 9.65           | 66446        | 52941   | 0.80    | 65436   | 49403   | 0.75    | 65535   | 48840   | 0.75    |
| 25.9           | 105770       | 73542   | 0.70    | 101950  | 67553   | 0.66    | 101770  | 66346   | 0.65    |
| 50.00          | 141450       | 87589   | 0.62    | 134860  | 80145   | 0.59    | 133690  | 78183   | 0.58    |
| 96.54          | 186020       | 100460  | 0.54    | 176030  | 90607   | 0.51    | 174520  | 88266   | 0.51    |

Addition of PES1 to the L354 polyethylene blow molding resin increased the melt strength. This data shows that the rheological properties of the blow molding resin can be tailored using the present interpolymer. The blends with W952 polyethylene blow molding resin and PES1 achieved a fractional tan (δ) at lower frequencies than the blow molding resin alone, indicating better melt strength, larger processing window, and potential for other resins to be used in this market.

Example 11

Extruded foam samples were made by blending P1 or PS 1200 (polystyrene, INEOS-NOVA LLC, PS) with PES1 and talc (Luzenac), pentane (Linde, purity >99%), glycerol monostearate (GMS, Pationic 1052A) in a 50 mm counter-rotating twin-screw extruder at 20 kg/hr. Foam cylinders were made using the conditions in the table below, butane as blowing agent (BA), and had the indicated physical properties.

Nominal refers to the extruder set temperature, Melt (extr) refers to the temperature of the melt measured by a thermocouple in the extruder, and Melt (IR) refers to the temperature extrudate measured by an IR probe.

|    | P1 (wt %) | PES1 (wt %) | Nom. (°C.) | Melt (extr) (°C.) | Melt (IR) (°C.) | BA (wt %) | Density (Kg/m³) | Modulus (MPa) |
|----|-----------|-------------|------------|-------------------|-----------------|-----------|-----------------|---------------|
| BL | 100 | — | 110 | 120 | — | 4.5 | 59.9 | 1.08 |
| BM | 100 | — | 100 | 109 | — | 7.8 | 36.3 | 0.67 |
| BN | 100 | — | 100 | 116 | — | 3.8 | 105.4 | 3.08 |
| BO | 85 | 15 | 110 | 120 | 102 | 4.2 | 86.3 | 3.3 |
| BP | 85 | 15 | 110 | 119 | 100 | 7.6 | 39.5 | 0.81 |
| BQ | 85 | 15 | 105 | 115 | 95 | 5.5 | 54.1 | 0.98 |
| BR | 70 | 30 | 100 | 122 | 107 | 3.0 | 123.6 | 7.14 |
| BS | 70 | 30 | 100 | 113 | 98 | 5.3 | 58.3 | 1.87 |
| BT | 70 | 30 | 100 | 108 | 98 | 9.2 | 51.9 | 1.21 |
| BU | 70 | 30 | 100 | 107 | 95 | 11.5 | 36.0 | 0.81 |
|    | PS (wt %) | | | | | | | |
| BL | 100 | — | — | 160 | 121 | 3.3 | 58.3 | 19.83 |
| BM | 100 | — | — | 147 | 115 | 4.8 | 45.7 | 15.61 |
| BN | 100 | — | — | 136 | 106 | 5.9 | 40.6 | 14.64 |
| BO | 85 | 15 | — | 161 | 126 | 3.3 | 61.9 | 21.98 |
| BP | 85 | 15 | — | 148 | — | 5.0 | 43.9 | 16.52 |
| BQ | 85 | 15 | — | 140 | 110 | 6.5 | 37.5 | 11.83 |
| BR | 70 | 30 | 156 | 126 | 120 | 3.3 | 65.0 | 12.76 |
| BS | 70 | 30 | 120 | 150 | 116 | 4.9 | 44.5 | 12.48 |
| BT | 70 | 30 | 120 | 145 | 110 | 6.3 | 36.0 | 11.83 |
| BU | 70 | 30 | 110 | 139 | 108 | 6.3 | 37.1 | 10.50 |

The interpolymers according to the invention blended with polyethylene provide lower density foams with equivalent properties, or similar density foams with superior properties compared to the virgin polyethylene foam. The interpolymers according to the invention blended with polystyrene provide softer foams at equivalent densities.

Example 12

This example demonstrates the addition of PES1 to P5 and shows increased throughput.

The polyolefin based films were produced using a Macro Engineering and Technology blown film line under the following conditions:
Blow Up Ratio (BUR)=2.5:1
Die Gap: 35 mil
Dual lip air ring
Film Gauge=1 mil
Melt Temperature=412° F.
Line Speed=71.8 ft/min.
Output=40 lbs/hr.

Dart Impact was determined according to ASTM D1709, Tear: according to ASTM D1922, and Tensile was determined using an Instrumet 5 head universal tester. Test speed was 20 inches/min and grip separation was 2.0 inches. Tensile secant modulus was determined using an Instrumet 5 head universal tester Test speed of 0.2 inches/min, grip separation was 2.020 inches. Modulus was measured at 1% strain. WVTR was conducted on a Permatran mocon unit. This analysis provided a value for the transmission rate of water vapor through a barrier in units of gm/100 in²/day or gm/m²/day. Water was HPLC grade. Samples were run in duplicate. OTR was conducted on a Ox-Tran Mocon unit. This analysis provided a value for the transmission rate of oxygen through a barrier in units of cc/100 in²/day or cc/m²/day. The oxygen used was ultra high purity, 99.99% pure. Samples were run in duplicate.

| Property | P5 | 90% P5/10% PES1 |
|----------|-----|-----------------|
| Dart Impact (g/mil) | 282 | 421 |
| Tear - MD (g/mil) | 313 | 220 |
| Tear - TD (g/mil) | 561 | 517 |
| 1% Sec Modulus - MD (MPa) | 176 | 278 |
| 1% Sec Modulus - TD (MPa) | 209 | 306 |
| Tensile Break Str - MD (MPa) | 34.4 | 45.6 |
| Tensile Break Str - TD (MPa) | 33 | 40.2 |
| Elongation at Break - MD (%) | 445 | 588 |
| Elongation at Break - TD (%) | 693 | 774 |
| Tensile Yield Str - MD (MPa) | 10.7 | 12.8 |
| Tensile Yield Str - TD (MPa) | 9.9 | 11.4 |
| Tensile Elong at Yield - MD (%) | 16 | 16 |
| Tensile Elong at Yield - TD (%) | 20 | 15 |
| Tensile Energy (J) MD | 1.2 | 2.39 |
| Tensile Energy (J) TD | 1.72 | 2.36 |
| WVTR (g/100 in²/day) | 1.34 | 1.368 |
| OTR (g/100 in²/day) | 578.8 | 515.8 |

The results indicate that incorporation of PES1 enhances P5 stiffness properties. The data show that blown films from the blend demonstrated enhanced throughput performance and physical properties of the film and antiblock characteristics.

Example 13

Samples were prepared as in Example 1 except that propylene copolymers (PC, N00-M00, Ineos) was used instead of polyethylene. Sample BY was 100% PC and sample BZ was 85% PC and 15% PES5.

Measurements were made as described in Example 1 using a Rheometric Scientific SR5 rheometer equipped with heated parallel plates with a glass chamber placed around the sample and plates with 50 cc/min $N_2$ flow. Samples were trimmed at a gap of 1.1 mm and then set to 1.00 mm for testing. Testing included a frequency sweep at 190° C., followed by a temperature ramp from 140° C. to 230° C.

| Haul Off Speed (m/min) | BY Stretch Ratio | BY Haul Off Force (cN) | BZ Stretch Ratio | BZ Haul Off Force (cN) |
|---|---|---|---|---|
| 1 | 4.19 | 3.12 | 4.19 | 5.24 |
| 2 | 8.89 | 2.97 | 8.89 | 4.80 |
| 3 | 13.08 | 2.94 | 13.08 | 4.96 |
| 4 | 17.79 | 2.97 | 17.78 | 5.12 |
| 5 | 21.97 | 2.97 | 21.97 | 5.13 |
| 6 | 26.67 | 3.07 | 26.68 | 5.15 |
| 7 | 30.86 | 3.07 | 30.86 | 5.20 |
| 8 | 35.57 | 3.11 | 35.57 | 5.21 |
| 9 | 39.75 | 3.11 | 39.75 | 5.17 |
| 10 | 44.46 | 3.13 | 44.46 | 5.20 |
| Mean Melt Strength (CN) | 3.0 | | 5.1 | |

The haul-off force data indicate that the polypropylene copolymer rheology is modified and melt strength is improved by 70% through addition of the interpolymer resin, allowing for faster extrusion rates, faster thermoforming cycle times and better quality parts.

Example 13

This example demonstrates the different rheological patterns of a polystyrene-ethylene-co-vinylene acetate copolymer compounded blend (prepared using a Leistritz extruder as described above) of similar composition to PES1 in terms of polystyrene and ethylene-co-vinylene acetate copolymer composition. The polystyrene was PS 1200 (INEOS-NOVA LLC) and the EVA was NA 480 (Equistar Chemicals, LP) a 7:3 ratio to simulate the PS/EVA ratio in PES1.

The capillary rheology results shown in the tables below.

| Shear Rate (1/s) | PS η (Pa·S) | EVA η (Pa·S) | UPES-315 η (Pa·S) | PS/EVA blend η (Pa·S) |
|---|---|---|---|---|
| 1000 | 267 | 308 | 296.7 | 247.8 |
| 701 | 348 | 382.1 | 389.9 | 322.4 |
| 502 | 437.3 | 470.7 | 491.2 | 396.2 |
| 299 | 623.5 | 660.8 | 723.3 | 558.7 |
| 199 | 843.2 | 870.4 | 1000 | 790.7 |
| 100 | 1476.3 | 1310 | 1723.3 | 1371.3 |
| 58 | 2174.9 | 1903 | 2563.3 | 1974.7 |
| 21 | 4723.2 | 3673.6 | 5612 | 4003.7 |
| 10 | 7651.9 | 5552.7 | 9260.2 | 6246.8 |
| 3.4 | 15744 | 10411.3 | 19146.7 | 11528.7 |

The data demonstrate the synergistic behavior that characterizes the rheology modification properties of the interpolymers of the present invention compared with compounded blends of a similar composition. The data indicates that when melt compounded into a blend, polystyrene (70%) and EVA (30%) exhibit an additive relationship in terms of rheological performance proportional to the PS and EVA content. Surprisingly, the data show that the same composition in the form of the present interpolymer resin particles provide synergistic rheological behavior compared to the straight PS, straight EVA and a melt compounded blend of both PS and EVA. The PS/EVA blend capillary rheology also exhibits signs of melt fracture at shear rates between 299 $s^{-1}$ and 502 $s^{-1}$, which is not observed for the interpolymer compositions, hence demonstrating a more shear stable composition for the interpolymer structure.

The table below shows DMA data (ω, G', G" and tan (δ)) for the samples.

| ω rad/s | G' Pa | G" Pa | tan(δ) |
|---|---|---|---|
| 0.05 | 1267 | 2894 | 2.28 |
| 0.07 | 1731 | 3690 | 2.13 |
| 0.10 | 2346 | 4640 | 1.98 |
| 0.14 | 3169 | 5777 | 1.82 |
| 0.19 | 4226 | 7082 | 1.68 |
| 0.26 | 5595 | 8580 | 1.53 |
| 0.36 | 7278 | 10257 | 1.41 |
| 0.50 | 9377 | 12101 | 1.29 |
| 0.70 | 11937 | 14142 | 1.18 |
| 0.97 | 14960 | 16250 | 1.09 |
| 1.35 | 18483 | 18493 | 1.00 |
| 1.87 | 22480 | 20711 | 0.92 |
| 2.60 | 27047 | 23042 | 0.85 |
| 3.60 | 32003 | 25305 | 0.79 |
| 5.00 | 37561 | 27606 | 0.73 |
| 6.96 | 43658 | 29760 | 0.68 |
| 9.66 | 50211 | 31933 | 0.64 |
| 12.40 | 55485 | 33565 | 0.60 |
| 18.61 | 64474 | 36098 | 0.56 |
| 25.91 | 72308 | 38172 | 0.53 |
| 36.00 | 80548 | 40238 | 0.50 |
| 50.00 | 89040 | 42311 | 0.48 |
| 69.51 | 97865 | 44430 | 0.45 |
| 96.50 | 106710 | 46653 | 0.44 |

The DMA data show that G' and G" intersect at the (1.35, $1.851 \times 10^4$) crossover point and that the PS/EVA blend material displays tan (δ) values greater than 1 at some shear rates. No intersect point is observed for the PES1 interpolymer and throughout the rheology spectrum, tan (δ) values are below one, indicating the superior rheological performance of the present interpolymer compared to the blend of similar composition as it relates to the ability to modify the flow, or elasticity of the materials in the melt phase.

The present invention has been described with reference to specific details of particular embodiments thereof. It is not intended that such details be regarded as limitations upon the scope of the invention.

What is claimed is:

1. A method of improving the bubble stability of a blown film of a thermoplastic resin comprising:
   providing a thermoplastic resin;
   blending interpolymer resin particles with the thermoplastic resin to provide a rheology modified thermoplastic resin; and
   forming a blown film of the rheology modified thermoplastic resin;
   wherein the interpolymer resin particles comprise a styrenic polymer intercalated within a polyolefin,
   wherein the thermoplastic resin is present as a continuous phase and the interpolymer resin particles are present as a dispersed phase; and wherein the rheology modified thermoplastic resin has a melt strength that is at least about 10% higher than the melt strength of the thermoplastic resin without the interpolymer resin particles.

2. The method according to claim 1, wherein the thermoplastic resin comprises a polyolefin.

3. The method according to claim 2, wherein the polyolefin is selected from the group consisting of polyethylene; polypropylene; copolymers ethylene and an olefinic monomer; copolymers of one or more olefinic monomers and one or more $C_1$-$C_4$ alkyl (meth)acrylates; copolymers of one or more olefinic monomers and acrylonitrile; copolymers of one or more olefinic monomers and vinyl acetate; copolymers of one or more olefinic monomers and butadiene; copolymers of one or more olefinic monomers and isoprene; copolymers of one or more olefinic monomers and styrene, and combinations thereof.

4. The method according to claim 3, wherein the polyethylene comprises one or more of linear low density polyethylene and low density polyethylene.

5. The method according to claim 1, wherein the thermoplastic resin is present in the rheology modified thermoplastic resin at from about 30 wt. % to about 99.9 wt. %. and the interpolymer resin particles are present in the rheology modified thermoplastic resin at from about 0.1 wt. % to about 70 wt. %.

6. The method according to claim 1, wherein the interpolymer resin particles comprise from about 20 wt. % to about 80 wt. % of one or more polyolefins and from about 20 wt. % to about 80 wt. % of one or more based on the interpolymer resin particles.

7. The method according to claim 1, wherein the polyolefin in the interpolymer resin particles includes one or more polymers selected from the group consisting of ethylene-vinyl acetate copolymers, HDPE, LDPE, LLDPE, VLDPE, polypropylene, thermoplastic olefins, thermoplastic elastomers resins, ethylene copolymers and combinations thereof.

8. The method according to claim 1, wherein the styrenic polymer in the interpolymer resin particles comprises one or more polymers derived from polymerizing a monomer mixture of one or more styrenic monomers and optionally one or more other monomers.

9. The method according to claim 1, wherein the rheology modified thermoplastic resin comprises one or more additives selected from the group consisting of, anti-blocking agents, antioxidants, anti-static additives, colorants, dyes, filler materials, flame retardants, heat stabilizers, impact modifiers, light stabilizers, light absorbers, lubricants, pigments, plasticizers, slip agents, softening agents, and combinations thereof.

10. The method according to claim 1, wherein the rheology modified thermoplastic resin is formed by using one or a combination of methods selected from the group consisting of mixing extrusion, milling, and blending to form a homogenous mixture.

11. A blown film comprising a rheology modified thermoplastic resin made according to the method of claim 1.

12. The blown film according to claim 11, wherein the resins have a melt strength at least 20% higher than the melt strength of the thermoplastic resin without the interpolymer resin particles.

13. The blown film according to claim 11, wherein the thermoplastic resin comprises a polyolefin.

14. The blown film according to claim 13, wherein the polyolefin is selected from the group consisting of polyethylene; polypropylene; copolymers ethylene and an olefinic monomer; copolymers of one or more olefinic monomers and one or more $C_1$-$C_4$ alkyl (meth)acrylates; copolymers of one or more olefinic monomers and acrylonitrile; copolymers of one or more olefinic monomers and vinyl acetate; copolymers of one or more olefinic monomers and butadiene; copolymers of one or more olefinic monomers and isoprene; copolymers of one or more olefinic monomers and styrene, and combinations thereof.

15. The blown film according to claim 14, wherein the polyethylene comprises one or more of linear low density polyethylene and low density polyethylene.

16. The blown film according to claim 11, wherein the thermoplastic resin is present in the rheology modified thermoplastic resin at from about 30 wt. % to about 99.9 wt. %. and the interpolymer resin particles are present in the rheology modified thermoplastic resin at from about 0.1 wt. % to about 70 wt. %.

17. The blown film according to claim 11, wherein the interpolymer resin particles comprise from about 20 wt. % to about 80 wt. % of one or more polyolefins and from about 20 wt. % to about 80 wt. % of one or more based on the interpolymer resin particles.

18. The blown film according to claim 11, wherein the polyolefin in the interpolymer resin particles includes one or more polymers selected from the group consisting of ethylene-vinyl acetate copolymers, HDPE, LDPE, LLDPE, VLDPE, polypropylene, thermoplastic olefins, thermoplastic elastomers resins, ethylene copolymers and combinations thereof.

19. The blown film according to claim 11, wherein the styrenic polymer in the interpolymer resin particles comprises one or more polymers derived from polymerizing a monomer mixture of one or more styrenic monomers and optionally one or more other monomers.

20. The blown film according to claim 11, wherein the rheology modified thermoplastic resin comprises one or more additives selected from the group consisting of, anti-blocking agents, antioxidants, anti-static additives, colorants, dyes, filler materials, flame retardants, heat stabilizers, impact modifiers, light stabilizers, light absorbers, lubricants, pigments, plasticizers, slip agents, softening agents, and combinations thereof.

21. The blown film according to claim 11, wherein the rheology modified thermoplastic resin is formed by using one or a combination of methods selected from the group consisting of mixing extrusion, milling, and blending to form a homogenous mixture.

22. A blown film comprising a resin that includes:
   from about 30 wt. % to about 99.9 wt. %. of a thermoplastic resin, and
   from about 0.1 wt. % to about 70 wt. % of interpolymer resin particles;
   wherein the interpolymer resin particles comprise a styrenic polymer intercalated within a polyolefin;
   wherein the thermoplastic resin is present as a continuous phase and the interpolymer resin particles are present as a dispersed phase; and
   wherein the resin has a melt strength that is at least about 10% higher than the melt strength of the thermoplastic resin without the interpolymer resin particles.

23. The blown film according to claim 22, wherein the thermoplastic resin comprises one or more polymers selected from the group consisting of polyethylene; polypropylene; copolymers ethylene and an olefinic monomer; copolymers of one or more olefinic monomers and one or more $C_1$-$C_4$ alkyl (meth)acrylates; copolymers of one or more olefinic monomers and vinyl acetate; and combinations thereof;

wherein the polyolefin in the interpolymer resin particles includes one or more polymers selected from the group consisting of ethylene-vinyl acetate copolymers, HDPE, LDPE, LLDPE, VLDPE, polypropylene, thermoplastic olefins, thermoplastic elastomers resins, ethylene copolymers and combinations thereof; and wherein the styrenic polymer in the interpolymer resin particles comprises one or more polymers derived from polymerizing a monomer mixture of one or more styrenic monomers and optionally one or more other monomers.

24. The blown film according to claim 22, wherein the resin has a melt strength at least 20% higher than the melt strength of the thermoplastic resin without the interpolymer resin particles.

25. The blown film according to claim 22 wherein the thermoplastic resin is one or more polymers selected from polyethylene; polypropylene; copolymers ethylene and an olefinic monomer, copolymers of ethylene and one or more $C_1$-$C_4$ alkyl (meth)acrylates, copolymers of ethylene and vinyl acetate, and combinations thereof;

wherein the polyolefin in the interpolymer resin particles includes one or more polymers selected from HDPE, LDPE, LLDPE, VLDPE, polypropylene, ethylene-vinyl acetate copolymers, ethylene copolymers and combinations thereof; and wherein the styrenic polymer in the interpolymer resin particles comprises one or more polymers derived from polymerizing a monomer mixture of styrene and optionally one or more other monomers selected from maleic anhydride, $C_1$-$C_4$ alkyl (meth)acrylates, acrylonitrile, vinyl acetate and combinations thereof.

* * * * *